| (12) United States Patent
Iossifidis et al. | (10) Patent No.: US 10,472,069 B2
(45) Date of Patent: Nov. 12, 2019 |

(54) RELEASE PIN

(71) Applicant: B/E Aerospace, Inc., Wellington, FL (US)

(72) Inventors: John Iossifidis, Miami, FL (US); Leo N. Escolar, Pembroke Pines, FL (US)

(73) Assignee: B/E Aerospace, Inc., Winston-Salem, NC (US)

( * ) Notice: Subject to any disclaimer, the term of this patent is extended or adjusted under 35 U.S.C. 154(b) by 306 days.

(21) Appl. No.: 15/474,518

(22) Filed: Mar. 30, 2017

(65) Prior Publication Data

US 2018/0283433 A1   Oct. 4, 2018

(51) Int. Cl.
*B64D 11/06*   (2006.01)

(52) U.S. Cl.
CPC ........ *B64D 11/0641* (2014.12); *B64D 11/064* (2014.12)

(58) Field of Classification Search
CPC ..... Y10T 403/32606; Y10T 403/32868; Y10T 403/32861; Y10T 403/32885; Y10T 403/59; Y10T 403/591; Y10T 403/597; Y10T 403/599; Y10T 403/60; Y10T 403/602; F16C 11/04; F16C 11/045; F16C 11/10; F16B 21/18; F16B 21/186; F16B 21/12; B64D 11/064; B64D 11/0641
See application file for complete search history.

(56) References Cited

U.S. PATENT DOCUMENTS

| 4,190,934 | A |   | 3/1980 | Wildi |   |
|---|---|---|---|---|---|
| 5,674,027 | A | * | 10/1997 | Warnaar | F16C 11/045 16/297 |
| 5,735,629 | A |   | 4/1998 | Sakamoto et al. |   |
| 5,807,007 | A | * | 9/1998 | Stemper | F16C 11/02 403/13 |

(Continued)

FOREIGN PATENT DOCUMENTS

| CH | 656512 | A5 |   | 7/1986 |   |
|---|---|---|---|---|---|
| GB | 270167 | A | * | 5/1927 | ............... F16B 21/04 |
| GB | 1328046 | A | * | 8/1973 | ................ F16B 1/00 |

OTHER PUBLICATIONS

International Search Report for International Application No. PCT/US2017/020528 (12 pgs.) dated Jun. 16, 2017.

*Primary Examiner* — Jonathan P Masinick
(74) *Attorney, Agent, or Firm* — Clements Bernard Walker

(57) ABSTRACT

A release pin that includes a shaft having an axially-extending large diameter segment, an axially-extending small diameter segment, a first head on a first end of the shaft adjacent the small diameter segment and a second head on a second end of the shaft adjacent the large diameter segment for capturing the pin in a bore in a first linkage. A spring residing on the small diameter segment and captured between the first head and the first linkage biases the shaft in a connected position with the large diameter segment of the shaft positioned in the bore of the linkage and the small diameter segment of the shaft exterior to the bore of the (Continued)

linkage. The large diameter segment is sized to capture a pivot hook on an end of a second linkage when in the connected position. The small diameter segment is sized to permit the pivot hook of the second linkage to be disconnected from the first linkage when the spring is compressed and the small diameter segment is positioned in the pivot hook of the second linkage.

16 Claims, 7 Drawing Sheets

(56) References Cited

U.S. PATENT DOCUMENTS

| | | | | |
|---|---|---|---|---|
| 6,357,955 B1* | 3/2002 | Hoffmann | ............ | F16D 1/12 |
| | | | | 403/150 |
| 6,565,156 B1* | 5/2003 | Yamashita | ............ | A47C 1/026 |
| | | | | 297/354.12 |
| 6,644,611 B1* | 11/2003 | Tai | ............ | F16C 11/10 |
| | | | | 248/292.13 |
| 7,591,604 B2* | 9/2009 | Roberts | ............ | B25F 5/02 |
| | | | | 16/326 |
| 7,614,594 B2* | 11/2009 | Baek | ............ | F16M 11/10 |
| | | | | 16/302 |
| 9,091,293 B1* | 7/2015 | Tseng | ............ | F16B 5/0208 |
| 9,120,566 B2* | 9/2015 | O'Connell | ............ | B64C 25/50 |
| 2010/0116114 A1 | 5/2010 | Liu et al. | | |
| 2018/0274296 A1* | 9/2018 | Foley | ............ | E06C 7/50 |

\* cited by examiner

RELEASE PIN

TECHNICAL FIELD AND BACKGROUND OF THE INVENTION

This invention relates to a release pin adapted to permit manual connection and disconnection of linkages. The pin is "self-contained" in that all of the parts of the release pin are contained in the assembly and the pin can be operated between the connected and disconnected positions manually and without removing any components. The release pin is quickly and easily manipulated between the connected and disconnected positions and does not require tools to effectuate the release or attachment. The release pin is simple and compact. In the particular embodiment disclosed in this application, the release pin is used to quickly connect and disconnect an actuator clevis from a passenger seat recline linkage arm on, for example, an aircraft passenger seat. However, the release pin has application in numerous environments where two links must be quickly connected and disconnected, particularly where tools are not available or the attachment point is not reachable with a tool.

SUMMARY OF THE INVENTION

It is therefore an object of the present invention to provide a release pin that is simple and easy to use.

It is another object of the invention to provide a release pin that can be used to quickly connect and disconnect linkages at their adjacent pivot points.

These and other aspects of the invention are achieved by providing a release pin that includes a shaft having an axially-extending large diameter segment, a coaxial and axially-extending small diameter segment, a first head on a first end of the shaft adjacent the small diameter segment and a second head on a second end of the shaft adjacent the large diameter segment for capturing the release pin in a bore in a first linkage. A spring residing on the small diameter segment and captured between the first head and the first linkage biases the shaft in a connected position with the large diameter segment of the shaft positioned in the bore of the first linkage and the small diameter segment of the shaft exterior to the bore of the first linkage. The large diameter segment is sized to capture a pivot hook on an end of a second linkage when in the connected position. The small diameter segment is sized to permit the pivot hook of the second linkage to be disconnected from the first linkage when the spring is compressed and the small diameter segment is positioned in the pivot hook of the second linkage.

According to one preferred embodiment of the invention, the first linkage is a clevis linkage sized to receive the pivot hook of the second linkage in the clevis.

According to another preferred embodiment of the invention, the biasing device is a coil spring.

According to another preferred embodiment of the invention, a second head is releasably attached to the large diameter segment of the shaft.

According to another preferred embodiment of the invention, the second head has a diameter that is less than a diameter of the first head.

According to another preferred embodiment of the invention, the first head is integrally formed with the shaft.

According to another preferred embodiment of the invention, the first head has a larger diameter than the diameter of the second head.

According to another preferred embodiment of the invention, the biasing device is a coil spring coaxially residing on the small diameter segment and captured between the first head and the first linkage to bias the shaft in a connected position with the large diameter segment of the shaft positioned in the bore of the first linkage and the small diameter segment of the shaft positioned exterior to the bore of the first linkage.

According to another preferred embodiment of the invention, a tapered transition is positioned between the large diameter segment of the shaft and the small diameter segment of the shaft.

According to another preferred embodiment of the invention, a release pin is provided that includes a shaft having an axially-extending large cross-dimension segment and an adjacent, coaxial and axially-extending small cross-dimension segment. A first head is provided on a first end of the shaft adjacent the small cross-dimension segment and a second head is provided on a second end of the shaft adjacent the large cross-dimension segment for capturing the pin in a bore in a first linkage. A spring is positioned on the shaft for biasing the shaft in a connected position with the large cross-dimension segment of the shaft positioned in the bore of the first linkage and the small cross-dimension segment of the shaft exterior to the bore of the first linkage. The large cross-dimension segment is sized to capture a pivot hook on an end of a second linkage when in the connected position, and the small cross-dimension segment sized to permit the pivot hook of the second linkage to be disconnected from the first linkage when the spring is compressed and the small cross-dimension segment is positioned in the pivot hook of the second linkage.

According to another preferred embodiment of the invention, the shaft is cylindrical, the cross dimensions of the large segment and the small segment are each diameters.

According to another preferred embodiment of the invention, the spring is a coil spring residing on the small diameter segment and captured between the first head and the first linkage to bias the shaft in a connected position with the large diameter segment of the shaft positioned in the bore of the first linkage and the small diameter segment of the shaft exterior to the bore of the first linkage.

According to another preferred embodiment of the invention, a release pin is provided that includes a shaft having an axially-extending large diameter segment and an adjacent, coaxial and axially-extending small diameter segment. A first head is provided on a first end of the shaft adjacent the small diameter segment and a releasably attached second head is provided on a second end of the shaft adjacent the large diameter segment for capturing the pin in a bore in a clevis linkage. A coil spring is positioned on the small diameter segment of the shaft for biasing the shaft in a connected position with the large diameter segment of the shaft positioned in the bore of the clevis linkage and the small diameter segment of the shaft positioned exterior to the bore of the first linkage. The large diameter segment is sized to capture a pivot hook on an end of a second linkage in the clevis linkage when in the connected position, and the small diameter segment is sized to permit the pivot hook of the second linkage to be disconnected from the clevis linkage when the coil spring is compressed and the small diameter segment is positioned in the pivot hook of the second linkage.

According to another preferred embodiment of the invention, the large diameter segment has a diameter greater than a dimension of an opening in the pivot hook of the second linkage and the small diameter segment has a diameter that is less than a dimension of the opening in the pivot hook of the second linkage.

According to another preferred embodiment of the invention, the small diameter segment of the shaft includes an enlarged diameter shoulder for retaining the coil spring in a centered position on the small diameter segment of the shaft.

According to another preferred embodiment of the invention, a washer is positioned on the large diameter segment of the shaft adjacent the clevis linkage and a washer is positioned on the small diameter segment of the shaft adjacent the clevis linkage.

BRIEF DESCRIPTION OF THE DRAWING FIGURES

The present invention is best understood when the following detailed description of the invention is read with reference to the accompanying drawings, in which.

DETAILED DESCRIPTION OF THE PREFERRED EMBODIMENT

Figure 1:
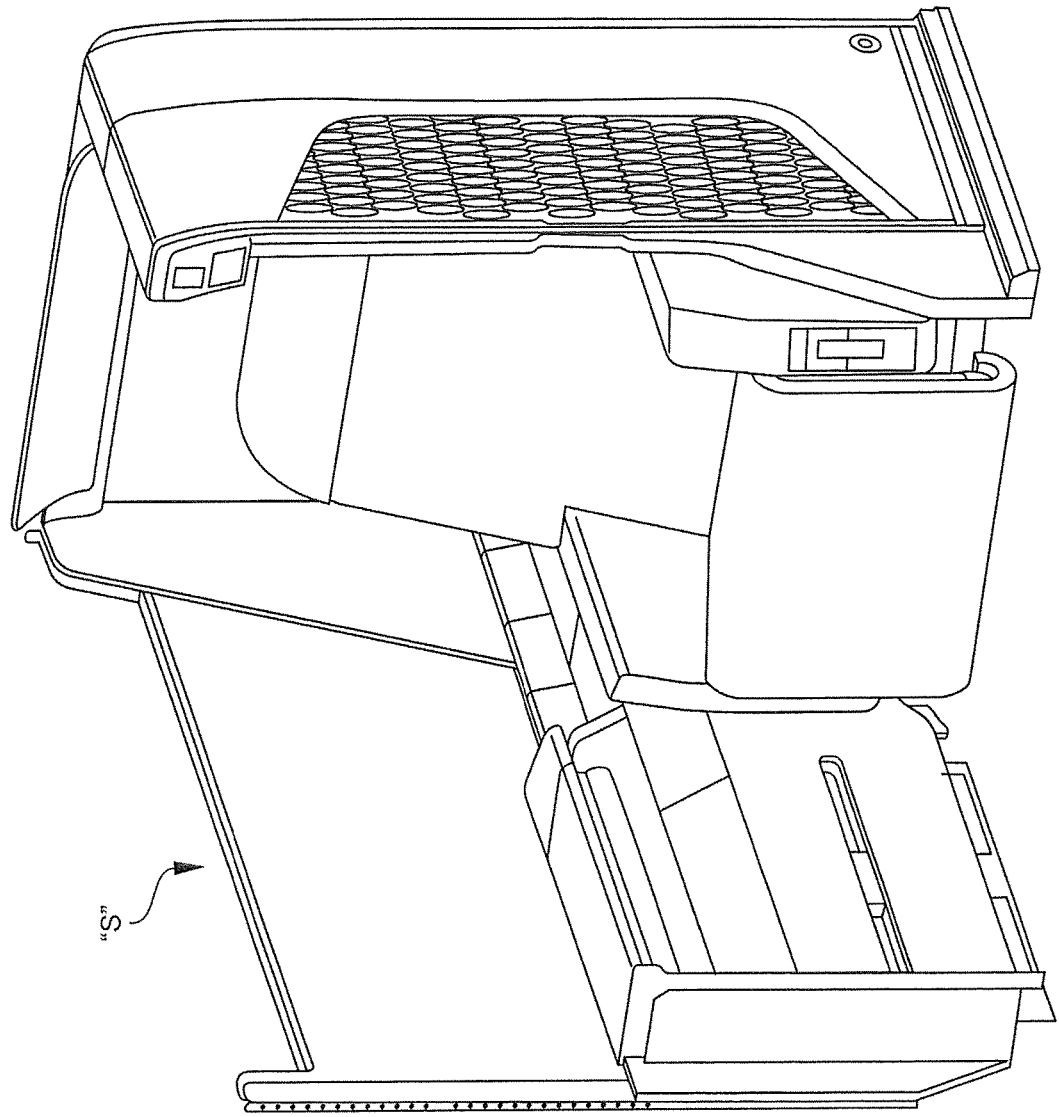
FIG. 1 is a front perspective view of an aircraft passenger seat of a type having a linkage suitable for use with the release pin according to an embodiment of the invention.
Figure 2:
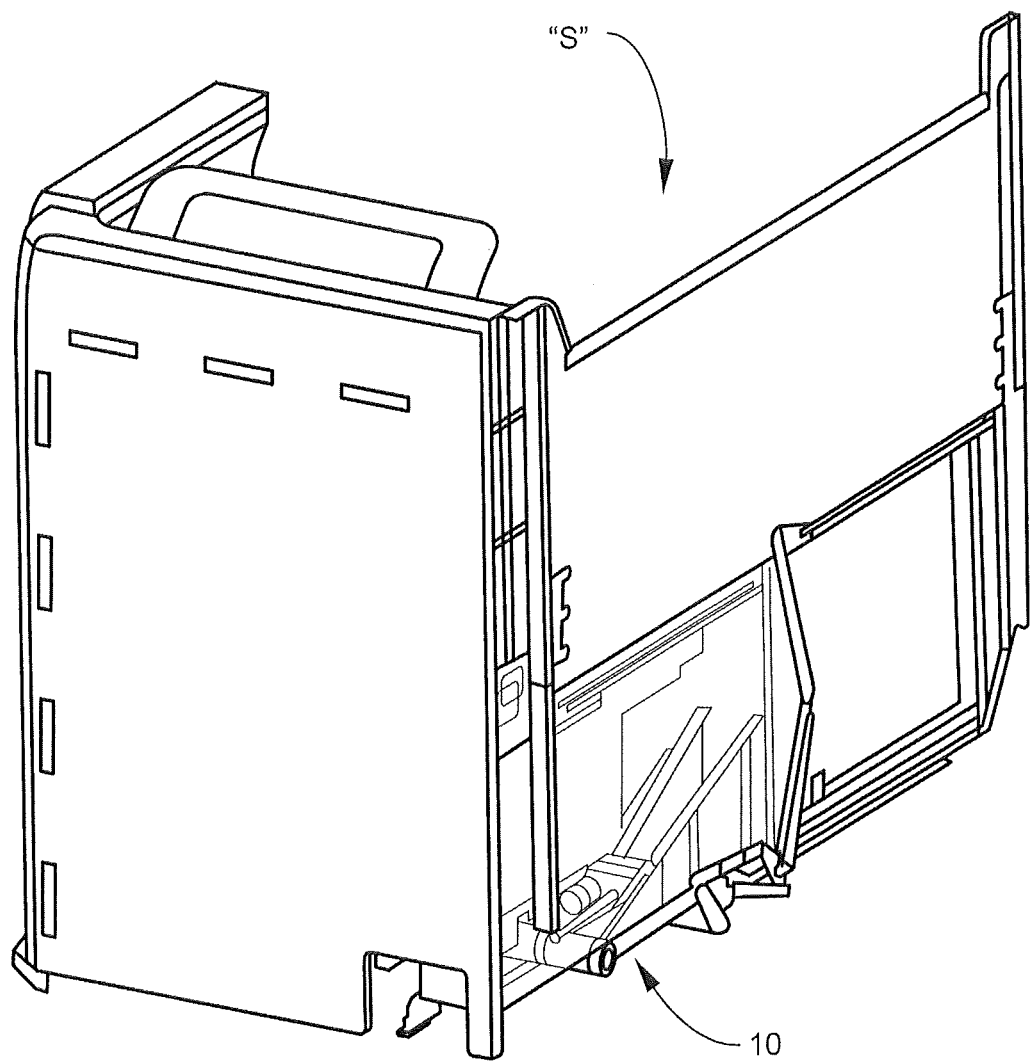
FIG. 2 is a rear perspective view of the aircraft passenger seat of FIG. 1, showing the location of the release pin according to the specific embodiment of the invention disclosed in this application.

Referring now to the drawings, a first class aircraft passenger seat is shown in FIG. 1 and indicated as reference letter "S". Such first class seats have actuators that enable the seat to move between various seating positions between a full upright TTOL position and a lie-flat or near lie-flat position. FIG. 2 illustrates broadly that a clevis linkage is provided for connecting an actuator to the seat recline linkages and is positioned on a side of the seat. The release pin 10 according to the invention enables the linkage to be disconnected and reconnected easily, quickly and without tools. The release pin 10 is retained in the clevis of the linkage and avoids the risk of loss. Of course, this specific usage is provided for purpose of illustration only. The release pin has many applications not specifically disclosed in this application.

Figure 3:
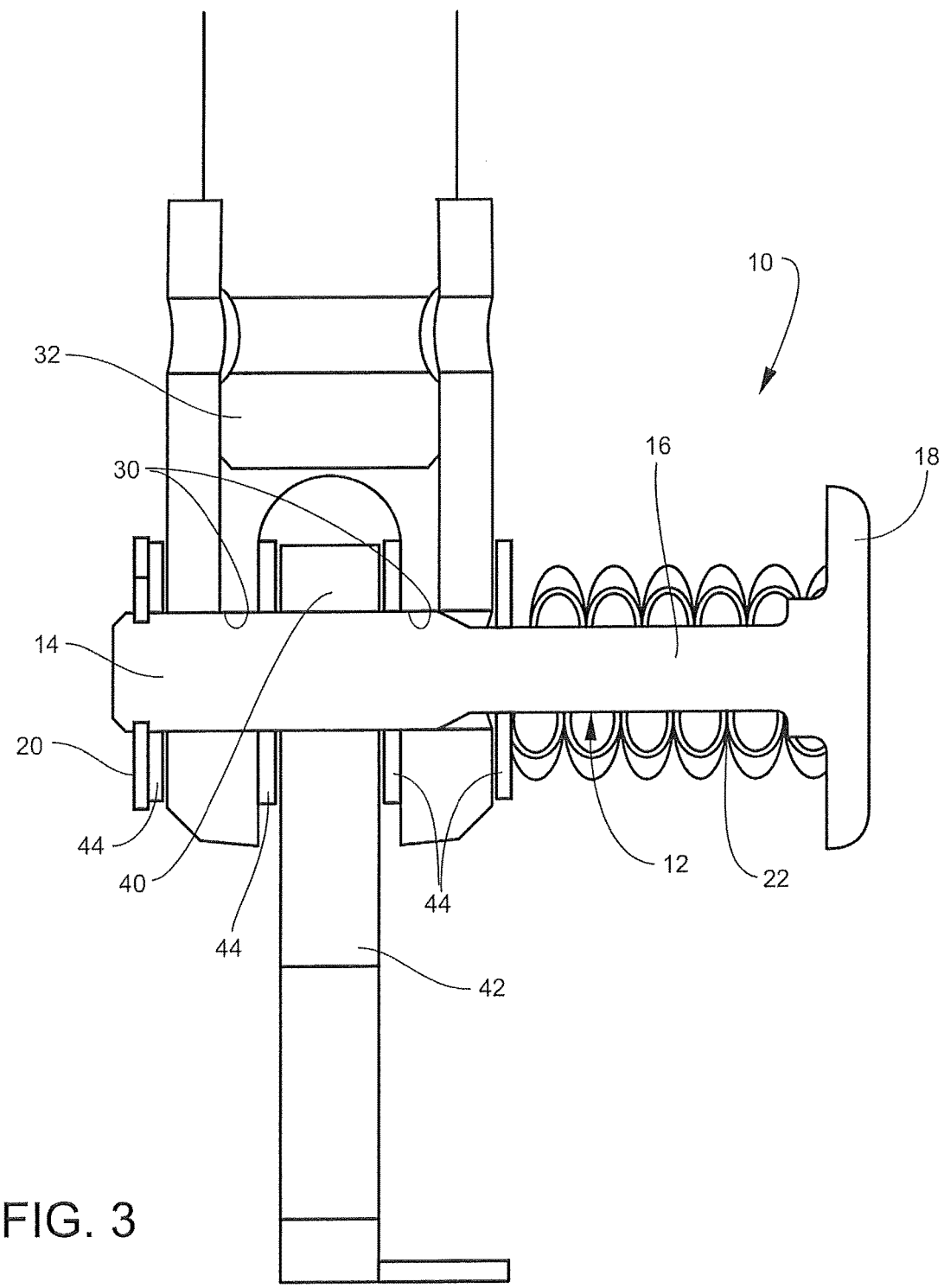
FIG. 3 is a modified cross-section of the release pin in a connected position in relation to the linkages.
Figure 4:
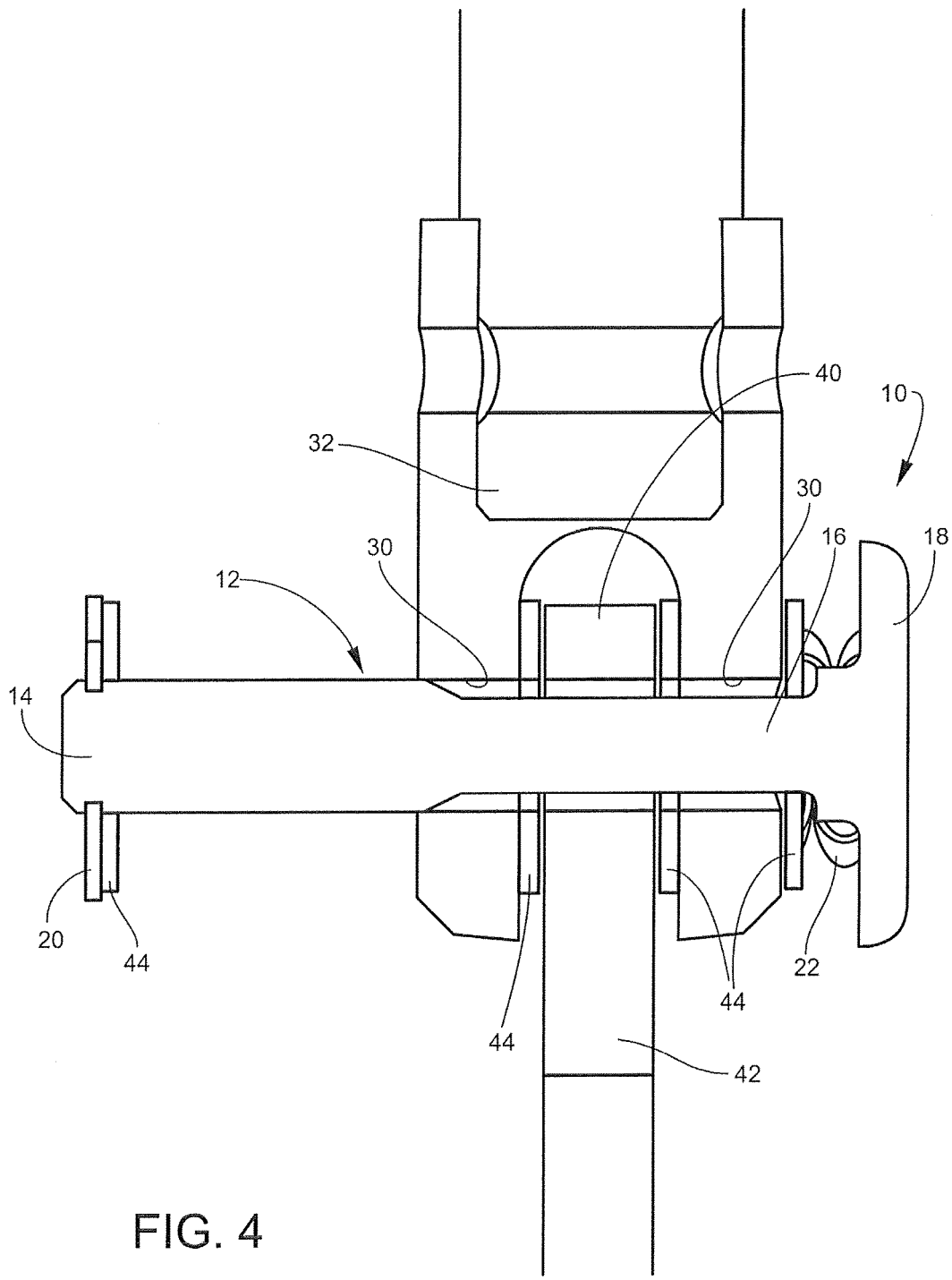
FIG. 4 is a modified cross-section of the release pin in a disconnected position in relation to the linkages.

Referring now to FIGS. 3 and 4, the release pin 10 includes a shaft 12 having an axially-extending large diameter segment 14, an axially-extending small diameter segment 16, a first head 18 on one end of the shaft 12 adjacent the small diameter segment 16 and a second head 20 on an opposite end of the shaft 12 adjacent the large diameter segment 14 for capturing the pin 10 in a bore 30 in an actuator clevis linkage 32. The first head 18 is preferably integrally formed with the shaft 12 and the second head 20 is preferably removable to permit removal of the release pin 10 from the bore 30 of the clevis linkage 32, if necessary.

A coil spring 22 resides concentrically on the small diameter segment 16 and is captured between the first head 18 and the actuator clevis linkage 32. A shoulder, which is part of the first head 18, centers the coil spring 22 on the shaft 12. The spring 22 biases the shaft 12 in a connected position with the large diameter segment 14 of the shaft 12 positioned in the bore 30 of the clevis linkage 32 and the small diameter segment 16 of the shaft 12 exterior to the bore 30 of the clevis linkage 32. The large diameter segment 14 is sized to capture a pivot hook 40 on an end of a second linkage 42 when in the connected position, as shown in FIG. 3. Suitable washers 44 are provided to distribute and balance the load of the shaft 12 on the clevis linkage 30 and the pivot hook 40.

As shown in FIG. 4, the small diameter segment 16 is sized to permit the pivot hook 40 of the second linkage 42 to be disconnected from the actuator clevis linkage 32 when the spring 22 is compressed and the small diameter segment 16 is positioned in the bore 30 and therefore in the pivot hook 40 of the second linkage 42. The spring 22 is compressed by manually depressing the head 18 inwardly against the bias of the spring 22 until the small diameter segment 16 is positioned within the clevis linkage 32.

By continued reference to FIGS. 3 and 4, note that the diameter of the bore 30 in the clevis linkage 32 is slightly larger than the diameter of the large diameter segment 14 of the shaft 12 to allow the shaft 12 to move laterally in relation to the clevis linkage 32. The opening of the pivot hook 40 is smaller than the diameter of the large diameter segment 14 and slightly larger than the diameter of the small diameter segment 16. When in the position shown in FIG. 3 the pivot hook 40 is therefore captured on the shaft 12 while still being rotatable on the shaft 12. When in the position shown in FIG. 4, the pivot hook 40 can be connected or disconnected from the small diameter segment 16 of the shaft 12.

Figure 5:
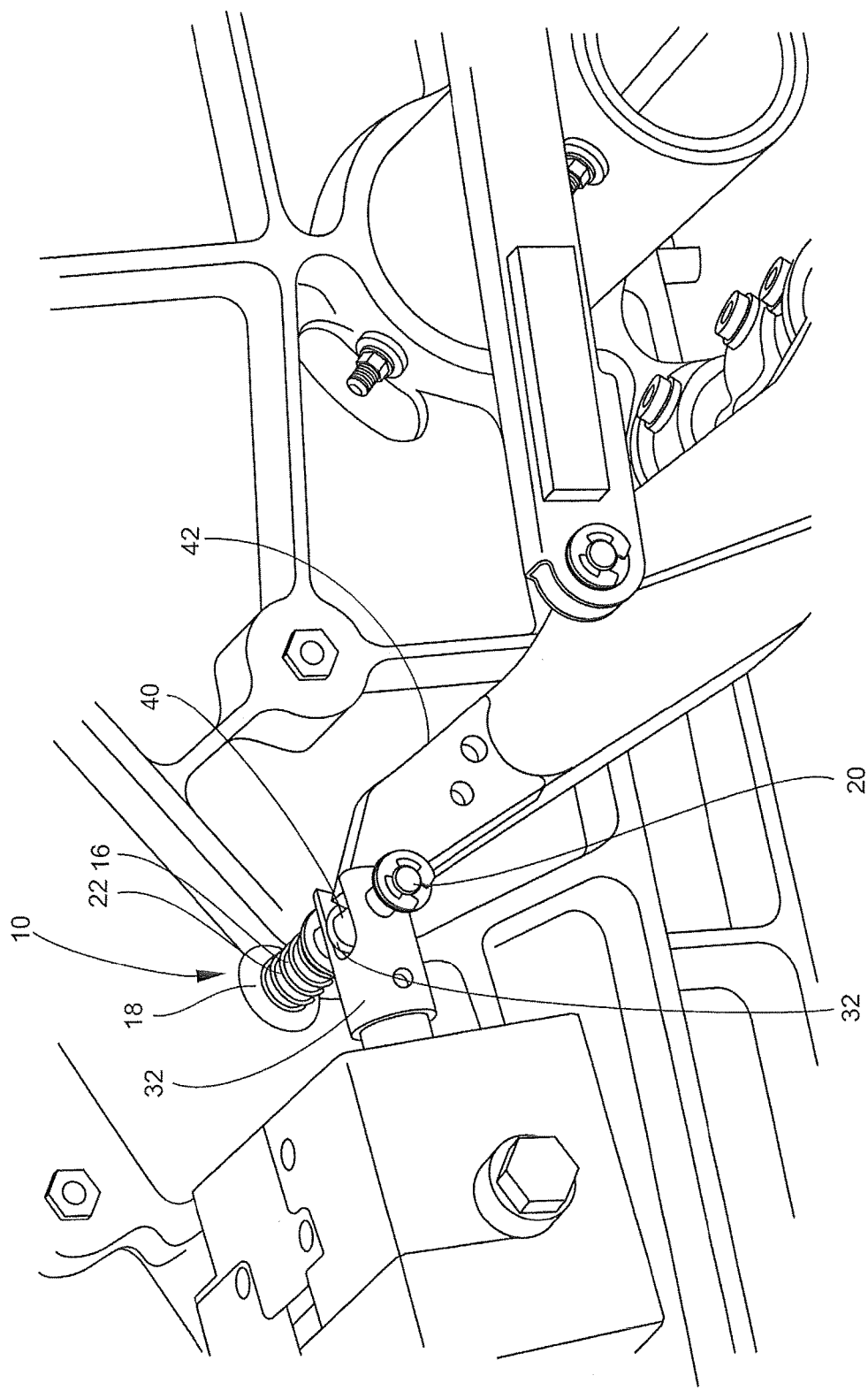
FIG. 5 is a fragmentary perspective view of the passenger seat linkages in the connected position.
Figure 6:
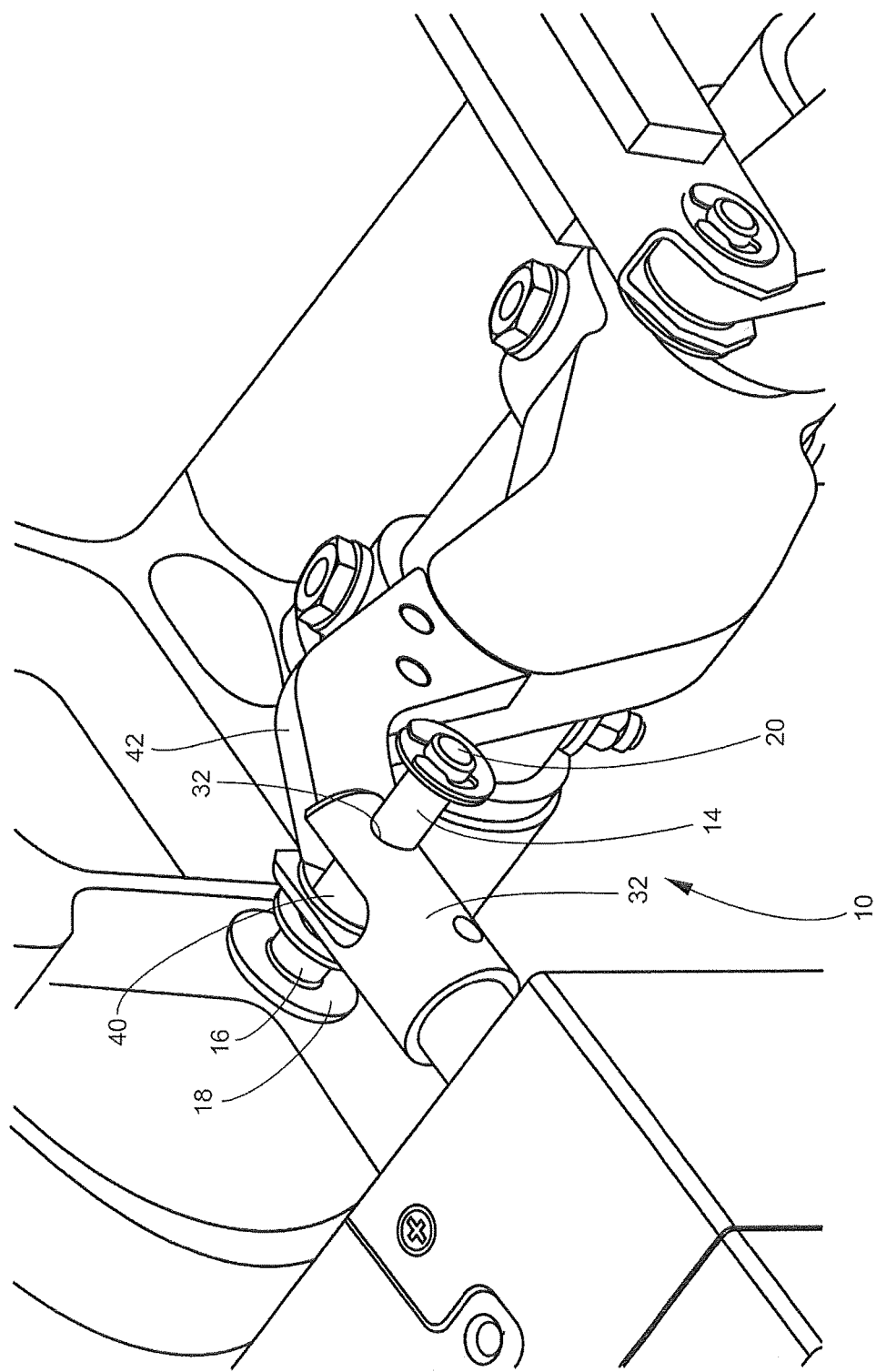
FIG. 6 is a fragmentary perspective view of the passenger seat linkages in the disconnected position with the linkage still positioned in the clevis.
Figure 7:
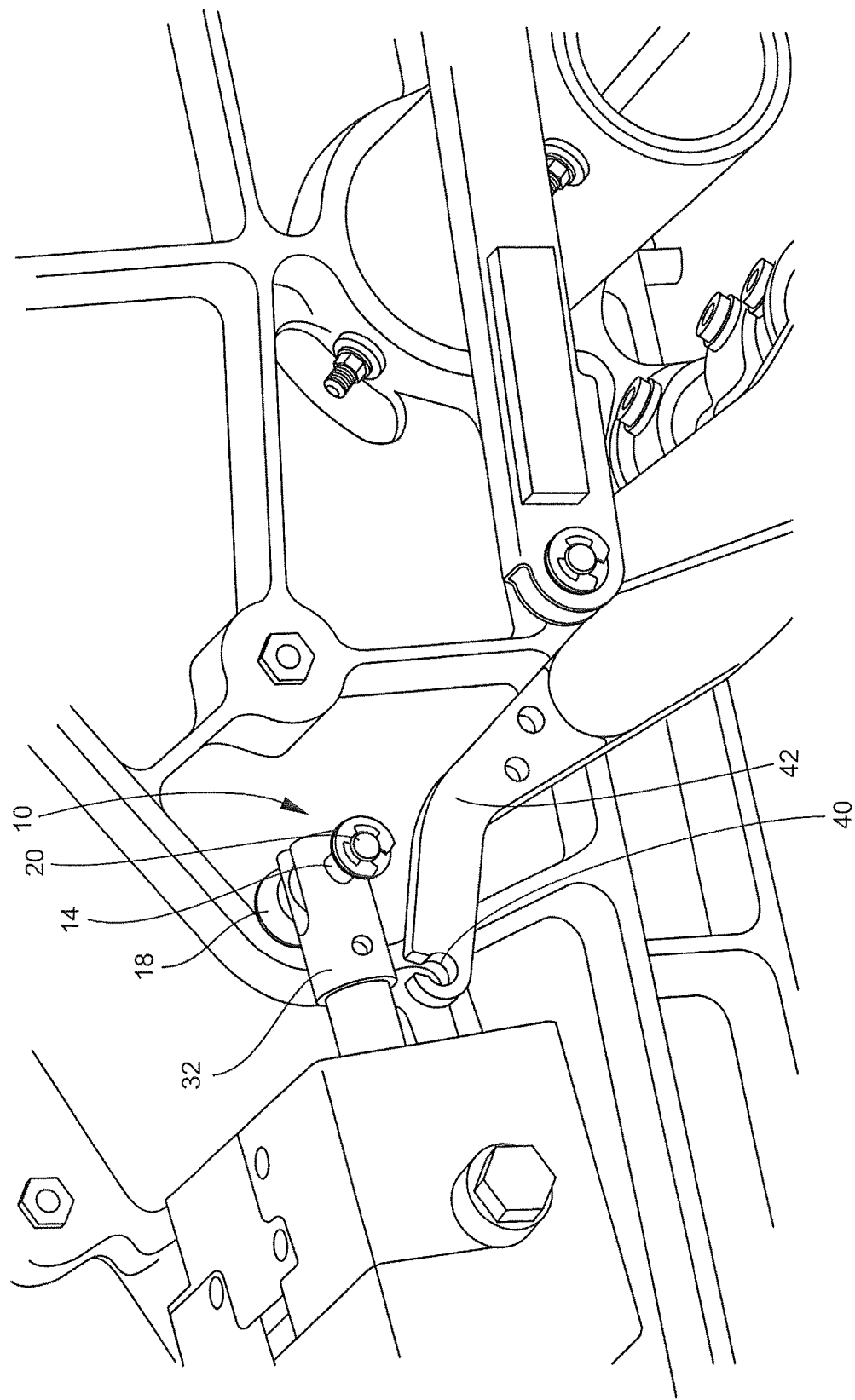
FIG. 7 is a fragmentary perspective view of the passenger seat linkages in the disconnected position with the linkage removed from positioned in the clevis.

Environmental views of the release pin 10 are shown in FIGS. 5-7. In FIG. 5, the release pin 10 is shown in the connected position with the pivot hook 40 rotatably-mounted on the clevis linkage 32. In FIG. 6, the release pin 10 has been manually shifted laterally so that the small diameter segment 16 is positioned in the clevis linkage 32. The pivot hook 40 is in a position ready to be disconnected, and in FIG. 7, the pivot hook 40 and linkage 42 is shown withdrawn from engagement with the shaft 12 of the release pin 10.

A release pin according to the invention has been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

We claim:

1. A release pin, comprising:
   (a) a shaft having an axially-extending large diameter segment;
   (b) an adjacent, coaxial and axially-extending small diameter segment;
   (c) a first head on a first end of the shaft adjacent the small diameter segment;
   (d) a coil spring positioned on the shaft for biasing the shaft in a connected position with the large diameter segment of the shaft positioned in a bore of a first linkage and the small diameter segment of the shaft positioned exterior to the bore of the first linkage, the coil spring residing on the small diameter segment captured between the first head and the first linkage; and
(e) the large diameter segment sized to capture a second linkage when in the connected position, and the small diameter segment sized to permit the second linkage to be disconnected from the first linkage when the biasing device is compressed and the small diameter segment is positioned in the second linkage.

2. A release pin according to claim 1, wherein the first linkage is a clevis linkage sized to receive a pivot hook of the second linkage, and the release pin is adapted to connect the pivot hook of the second linkage into the clevis linkage.

3. A release pin according to claim 1, and including a second head releasably attached to the large diameter segment of the shaft.

4. A release pin according to claim 3, wherein the second head has a diameter that is less than a diameter of the first head.

5. A release pin according to claim 3, wherein the first head has a larger diameter than the diameter of the second head.

6. A release pin according to claim 1, wherein the first head is integrally, formed with the shaft.

7. A release pin according to claim 1, and including a tapered transition between the large diameter segment of the shaft and the small diameter segment of the shaft.

8. A release pin, comprising:
(a) a shaft having an axially-extending large cross-dimension segment;
(b) an adjacent, coaxial and axially-extending small cross-dimension segment;
(c) a first head on a first end of the shaft adjacent the small cross-dimension segment;
(d) a second head on a second end of the shaft adjacent the large cross-dimension segment for capturing the pin in a bore in a first linkage;
(e) a coil spring positioned on the shaft for biasing the shaft in a connected position with the large cross-dimension segment of the shaft positioned in the bore of the first linkage and the small cross-dimension segment of the shaft exterior to the bore of the first linkage, the coil spring residing on the small cross-dimension segment and captured between the first head and the first linkage; and
(f) the large cross-dimension segment sized to capture a pivot hook on an end of a second linkage when in the connected position, and the small cross-dimension segment sized to permit the pivot hook of the second linkage to be disconnected from the first linkage when the spring is compressed and the small cross-dimension segment is positioned in the pivot hook of the second linkage.

9. A release pin according to claim 8, wherein the first linkage is a clevis linkage sized to receive the pivot hook of the second linkage, and the release pin is adapted to connect the pivot hook of the second linkage into the clevis linkage.

10. A release pin according to claim 8, wherein shaft is cylindrical and the cross dimensions of the large segment and the small segment are each diameters.

11. A release pin according to claim 8, wherein the first head and the second head are annular and the second head has a diameter that is greater than a diameter of the first head.

12. A release pin according to claim 8, wherein the first head is integrally formed with the shaft.

13. A release pin, comprising:
(a) a shaft having an axially-extending large diameter segment;
(b) an adjacent, coaxial and axially-extending small diameter segment;
(c) a first head on a first end of the shaft adjacent the small diameter segment;
(d) a releasably attached second head on a second end of the shaft adjacent the lame diameter segment for capturing the pin in a bore in a clevis linkage;
(e) a coil spring positioned on the small diameter segment of the shaft for biasing the shaft in a connected position with the large diameter segment of the shaft positioned in the bore of the clevis linkage and the small diameter segment of the shaft positioned exterior to the bore of the first linkage; and
(f) the large diameter segment sized to capture a pivot hook on an end of a second linkage in the clevis linkage when in the connected position; and the small diameter segment sized to permit the pivot hook of the second linkage to be disconnected from the clevis linkage when the coil spring is compressed and the small diameter segment is positioned in the pivot hook of the second linkage.

14. A release pin according to claim 13, wherein the large diameter segment has a diameter greater than a dimension of an opening in the pivot hook of the second linkage and the small diameter segment has a diameter that is less than a dimension of the opening in the pivot hook of the second linkage.

15. A release pin according to claim 13, wherein the small diameter segment of the shaft includes an enlarged diameter shoulder for retaining the coil spring in a centered position on the small diameter segment of the shaft.

16. A release pin according to claim 13, and including a washer positioned on the large diameter segment of the shaft adjacent the clevis linkage and a washer positioned on the small diameter segment of the shaft adjacent the clevis linkage.

* * * * *